United States Patent
Gilson

(10) Patent No.: US 9,148,254 B2
(45) Date of Patent: Sep. 29, 2015

(54) VARIABLE INTERLEAVE DATA TRANSMISSION

(71) Applicant: COMCAST CABLE COMMUNICATIONS, LLC, Philadelphia, PA (US)

(72) Inventor: Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/293,531

(22) Filed: Jun. 2, 2014

(65) Prior Publication Data

US 2014/0351670 A1 Nov. 27, 2014

Related U.S. Application Data

(63) Continuation of application No. 13/925,217, filed on Jun. 24, 2013, now Pat. No. 8,775,900, which is a continuation of application No. 13/616,362, filed on Sep. 14, 2012, now Pat. No. 8,489,964, which is a continuation of application No. 12/494,347, filed on Jun. 30, 2009, now Pat. No. 8,296,624.

(51) Int. Cl.
*H03M 13/00* (2006.01)
*H04L 1/00* (2006.01)

(52) U.S. Cl.
CPC ............ *H04L 1/0071* (2013.01); *H04L 1/0001* (2013.01); *H04L 1/0025* (2013.01)

(58) Field of Classification Search
CPC .... H04L 1/0001; H04L 1/0025; H04L 1/0071
USPC .................................................. 714/755, 762
See application file for complete search history.

(56) References Cited

U.S. PATENT DOCUMENTS

| | | | |
|---|---|---|---|
| 6,198,748 B1 | 3/2001 | Bruckert | |
| 6,337,642 B1 | 1/2002 | Yagil | |
| 6,631,491 B1 * | 10/2003 | Shibutani et al. | ............. 714/762 |
| 6,732,315 B2 | 5/2004 | Yagil et al. | |
| 6,856,625 B1 | 2/2005 | Shamsunder et al. | |
| 6,959,048 B1 | 10/2005 | Horneman et al. | |
| 6,971,057 B1 | 11/2005 | Delvaux et al. | |
| 7,529,984 B2 | 5/2009 | Heise | |

(Continued)

FOREIGN PATENT DOCUMENTS

| | | |
|---|---|---|
| WO | 99/54818 A1 | 10/1999 |
| WO | 03013046 A1 | 2/2003 |
| WO | 2009/003403 A1 | 1/2009 |

OTHER PUBLICATIONS

Fellows, David et al. "DOCSIS Cable Modem Technology", IEEE Communications Magazine, Mar. 2001, pp. 202-209, IEEE.

(Continued)

*Primary Examiner* — Sam Rizk
(74) *Attorney, Agent, or Firm* — Banner & Witcoff, Ltd.

(57) ABSTRACT

In cable modem termination systems (CMTS) and other information transmission systems, a method for changing the interleave depth associated with each data stream is provided. This may be done dynamically, and for any subset of downstream devices such as modems. The interleave depth may be set on an individual device level. Embodiments may decrease data receiving latency on devices that do not suffer from error rates, such as caused by burst noise, while maintaining throughput on devices with high error rates.

20 Claims, 12 Drawing Sheets

(56) References Cited

U.S. PATENT DOCUMENTS

| | | |
|---|---|---|
| 7,600,163 B2 | 10/2009 | Wan et al. |
| 2002/0044612 A1 | 4/2002 | Sipola |
| 2002/0051499 A1 | 5/2002 | Cameron et al. |
| 2003/0185180 A1 | 10/2003 | Min et al. |
| 2004/0117713 A1 | 6/2004 | Cameron |
| 2006/0150059 A1 | 7/2006 | Modlin |
| 2006/0153311 A1 | 7/2006 | Xue et al. |
| 2007/0011559 A1 | 1/2007 | Cioffi et al. |
| 2007/0143498 A1* | 6/2007 | Uhlemann .............. 709/238 |
| 2008/0092013 A1 | 4/2008 | Hollums |
| 2008/0151854 A1* | 6/2008 | Mantha et al. ............ 370/342 |
| 2008/0256418 A1 | 10/2008 | Luby et al. |
| 2009/0185605 A1 | 7/2009 | Heise |
| 2009/0300299 A1 | 12/2009 | Saxe et al. |

OTHER PUBLICATIONS

Physical Media Dependent Sublayer Specification, DOCSIS 1.1 Part 1: Radio Frequency Interface, Jan. 23, 2005, ANSI/SCTE23-1-2005 (All 410 pages provided, but attention is directed to pp. 23-49).

Physical Layer Specification, Data Over Cable Service Interface Specifications DOCSIS 3.0, May 22, 2008, CM-SP-PHYv3.0-107-080522 (All 170 pages provided, but attention is directed to pp. 30-33).

Extended European Search Report—EP 10164695.8—Mailing date: Dec. 3, 2014.

* cited by examiner

VARIABLE INTERLEAVE DATA TRANSMISSION

RELATED APPLICATIONS

This application is a continuation of pending U.S. patent application Ser. No. 13/925,217, filed Jun. 24, 2013, which is a continuation of U.S. patent application Ser. No. 13/616,362, filed Sep. 14, 2012, now U.S. Pat. No. 8,489,964, issued on Jul. 16, 2013, which is a continuation of U.S. patent application Ser. No. 12/494,347, filed Jun. 30, 2009, now U.S. Pat. No. 8,296,624, issued on Oct. 23, 2012. The above-identified applications are hereby incorporated by reference.

FIELD OF THE DISCLOSURE

The disclosure relates generally to data transmission. More specifically, the disclosure is directed towards data interleaving for data transmission.

BACKGROUND

Broadband data distribution systems are a popular way to deliver data to and receive data from a large number of buildings or residences in a geographic area. Examples of such systems are cable modem networks, fiber optic networks, and power system carrier signal distribution. For the example of cable modem systems, typically a head end unit such as a cable modem termination system (CMTS) is connected by coax cable to multiple (often several hundred) terminating cable modems for end users. The CMTS typically uses a protocol such as IP (Internet Protocol) to route data packets to specific cable modems on the cable data network.

Data transmitted over any type of transmission medium is subject to noise, which can reduce the data throughput. Many techniques are used to reduce transmission errors caused by noise. One technique is known as interleaving, in which data sent from a CMTS to one or more specific cable modems (CMs) is interleaved with data for other CMs. Such interleaving can reduce data loss due to burst noise, and is defined by the Data Over Cable Service Interface Specifications (DOCSIS), which specify cable modem requirements for data delivery. Currently the interleave depth (which defines the amount of data interleaving) is determined and statically set by the CMTS for all devices downstream from the CMTS.

But statically setting the interleave depth for an entire cable data network may not be optimal for all the CMs. Higher interleave depths cause every device to have an increased latency which may not be necessary for most of the devices. Lower interleave depths reduce latency, but may result in an unacceptably high level of unrecoverable packets due to burst noise for a subset of CMs.

BRIEF SUMMARY

The following presents a simplified summary of various features in order to provide a basic understanding of those features. This summary is not intended to 1) provide an extensive overview of every aspect of the concepts herein; 2) identify key or critical elements, or 3) delineate the scope of the concepts herein. The following summary merely presents some concepts in a simplified form as a prelude to the more detailed description provided below.

Some embodiments herein provide for dynamically setting interleave depths for various groups of devices, and/or for individual devices. The centralized network control system (e.g., a CMTS) may classify various data receiving devices (e.g., CMs) into various interleave depths. Where the data receiving device's (e.g., CM's) performance is monitored, embodiments may be configured to determine if increased noise is interfering with traffic, requiring a greater interleave depth. If noise has not affected traffic throughput, the interleave depth may be lowered for the specific data receiving device, lowering latency for that device.

Embodiments may allow for an interleave depth to be associated with one or more data streams. The associated interleave depths may be used to determine which timeslots will be used to transmit data associated with selected data streams.

In some embodiments, a map may be distributed to one or more data receiving devices (e.g., CMs). The map may contain a list correlating timeslots to data streams. Alternatively, the map may contain information sufficient to determine which timeslots are associated with each data stream. The map may vary dynamically according detection of burst noise. The recipients may be configured to reconstruct the datastream using the information from the map.

The map may be sent to all data receiving devices and/or divided into parts and sent selectively to individual data receiving devices and/or divided into groups and sent to groups of data receiving devices. In this manner, the individual data receiving devices and/or groups of data receiving devices may be provided with the information from the table needed to receive information destined for the respective devices.

Additionally, data may be provided for simultaneously storing more than one map where the map dynamically varies. The system may then provide instructions to the data receiving devices (e.g., CM) to switch over the new map upon receipt of a triggering event. In this way the interleave map may dynamically vary without interrupting the flow of data.

In some embodiments, the interleave depth associated with each data stream may be adjusted. Adjustments may be made in response to errors detected by the data receiving and/or a centralized network management system. Adjustments to the associated interleave depths may also be made in response to the interleave depths requested by other receivers on the network and/or other nodes in the network. For example, some cable lines may be above ground and subject to ice loads during winter storms. This may subject devices associated with those nodes to more severe error conditions. Further, a node may have a receiver that is on the way to failing. Again, devices associated with that node would require higher interleaved depths. The same burst error corrective measures would not be required for other nodes in the system that may have buried cables and/or properly functioning receivers. The present system allows adjustments on an individual receiver basis and/or on the basis of groups of receivers such as those associated with a node.

BRIEF DESCRIPTION OF THE DRAWINGS

A more complete understanding of the features herein and the advantages thereof may be acquired by referring to the following description in consideration of the accompanying drawings, in which like reference numbers indicate like features, and wherein:

FIG. 7b illustrates the result of the method of FIG. 7a.

FIG. 8b illustrates the result of the method of FIG. 8a.

DETAILED DESCRIPTION

In the following description of the various embodiments, reference is made to the accompanying drawings, which form a part hereof, and in which is shown by way of illustration various embodiments in which the features herein may be practiced. It is to be understood that other embodiments may be utilized and structural and functional modifications may be made without departing from the scope of the present disclosure.

Figure 1:
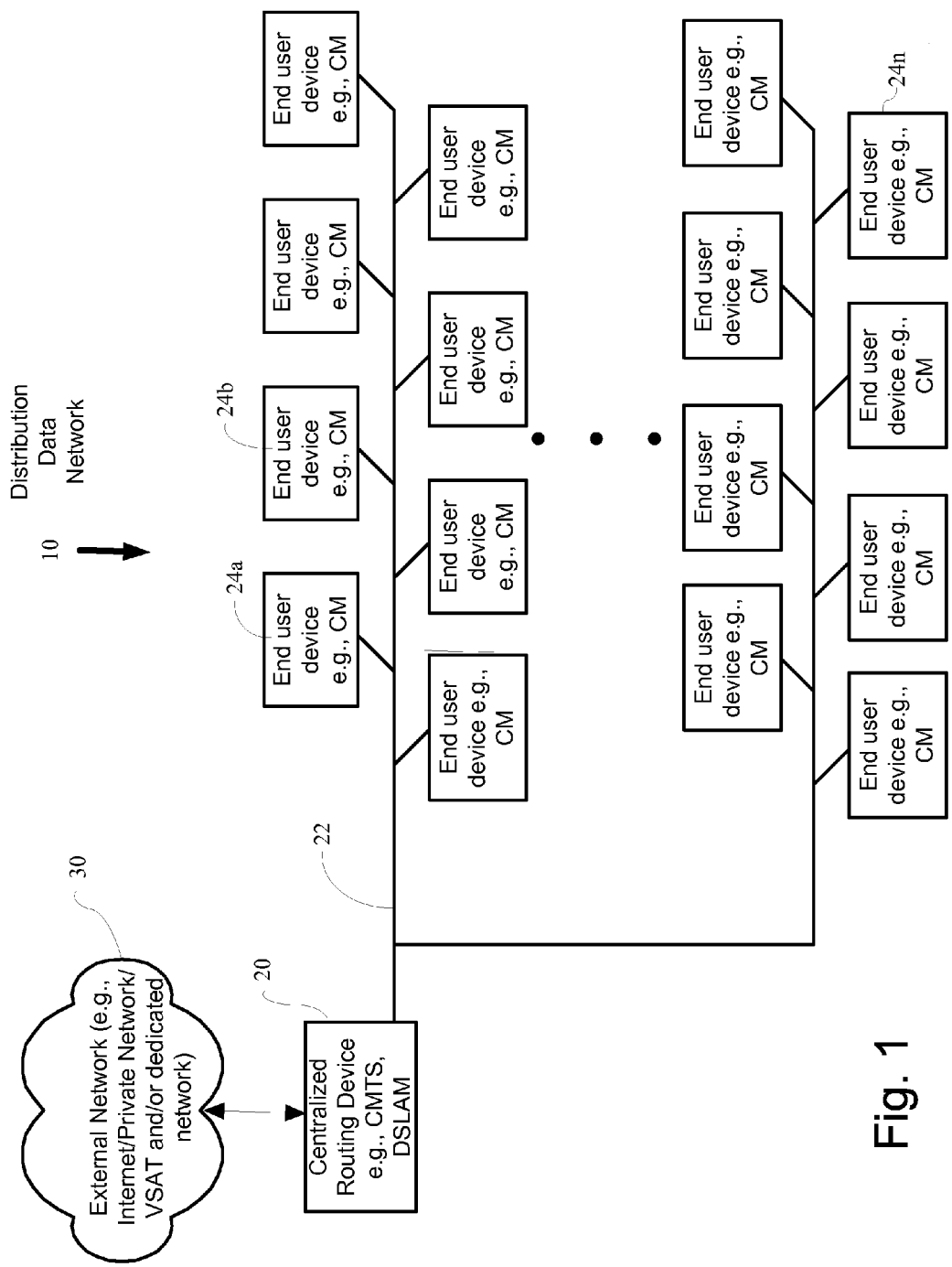
FIG. 1 illustrates a data network that may be utilized by one or more embodiments described herein.

FIG. 1 illustrates an exemplary data distribution network (e.g., a cable network, DSL network, VSAT network, satellite network, wireless network) that may utilize embodiments of the features described herein. A centralized routing device 20 such as a cable modem termination system(CMTS)/DSLAM may be connected by a transmission medium such as a fiber, coaxial cable, wireless, or other transmission medium 22 to multiple modems (e.g., cable modems (CM)) 24 in subscriber locations, for example businesses or residences. Centralized router 20 may reside in the headend, distribution hub, or some other location. Centralized router 20 may be configured to transmit communications from connected sources, such as the external network 30 (e.g., the internet), to various end user devices 24 (e.g., cable modems) via transmission medium 22. Another example of a connected source may be television signals sent to a cable TV subscriber's home. The distribution data network may include other components such as repeaters and other active components (not shown).

Other data transmission architectures are possible, such as hybrid fiber coax (HFC), where fiber cables carry the cable signal to pockets of residences (generally between 100 and 2000), and then coaxial cables carry the signals the rest of the way to each end user device 24. As shown in FIG. 1, the final coaxial link 22 carries signals that are delivered to all the end user devices 24a-n (e.g., cable modems CM).

Most cable data networks and equipment conform to a specification known as Data Over Cable Service Interface Specifications (DOCSIS). DOCSIS defines several layers of protocols, with each layer built on top of the functionality provided by the lower layers. One of these layers is the MPEG-2 transmission convergence layer (used for downstream data only), which defines how data may be encapsulated in 188-byte MPEG-2 frames. This allows the data, such as information from the internet, to be multiplexed with other MPEG streams, such as MPEG-2 video.

Figure 1A:
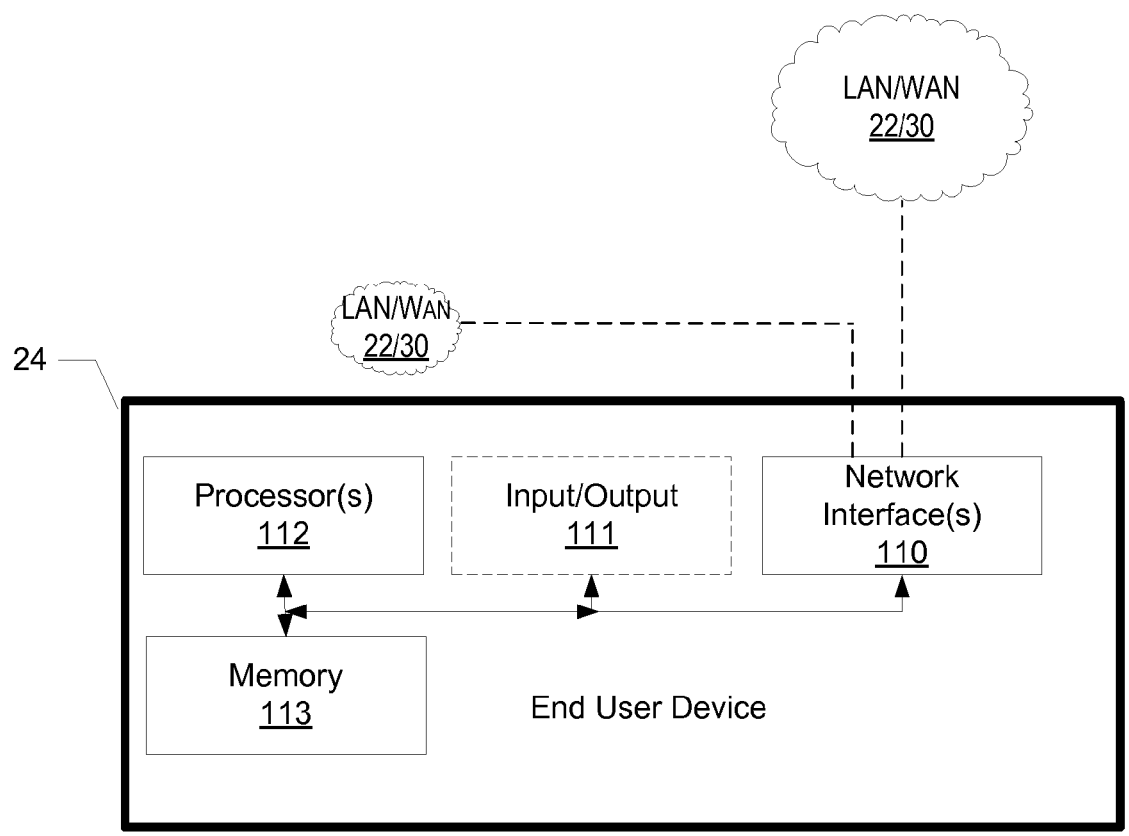
FIG. 1a illustrates a computing device that may be used to implement the features described herein.

FIG. 1a illustrates one example of an end user device 24 that may be used to implement one or more features described herein. The end user device 24 (discussed below) may be connected to various networks, such as a wide area network (WAN) 101 (e.g., the Internet), a local area network (LAN) 102, network 22 (shown in FIG. 1), a wireless/cellular network, and/or other networks. The specific connection may be via coaxial cable, optical cable, satellite, cellular wireless, and/or other type of desired connection. The networks may include any number of other computing devices. Computing device 100 may be any type of computing device capable of performing the functions described herein. For example, end user device 24 may be a CM, a broadcasting station, a mobile phone or other mobile device, a standalone PC, a rack-mounted server, a set top box, etc.

The connection of end user device 24 to any networks may be achieved through one or more network interfaces 110. The network interfaces may use a variety of communication means, including twisted pair wires, coaxial cable, fiber optics, radio waves, or other means of communication. Other devices may be connected to end user device 24 through optional additional input/output interfaces 111 (e.g., keyboard, mouse, serial or USB port, etc.).

Computing device 100 may include one or more processors 112, and may include one or more computer-readable memories 113. Memories 113 may include any desired type of data storage, such as hard drives, flash memories, RAM, etc.

One or more aspects described herein may be embodied in computer-executable instructions and/or computer-usable or readable data stored in memory 113. The instructions may be one or more program modules, executed by one or more processors 112 or other devices. Program modules may include routines, programs, objects, components, data structures, etc. that perform particular tasks or implement particular abstract data types when executed by a processor in a computer or other device. The modules may be written in a source code programming language that is subsequently compiled for execution, or they may be written in an interpreted language or a scripting language such as (but not limited to) HTML or XML. The computer executable instructions may be stored on a computer readable medium such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more of the features described, and such data structures are contemplated within the scope of computer executable instructions and computer-usable data described herein. Embodiments may be implemented in software and/or hardware.

As noted above, the functionality of end user device 24 may be spread across multiple computing devices. In certain situations it may be advantageous to distribute processing load across multiple devices, to segregate transactions based on geographic location, user access level, quality of service (QoS), etc. FIG. 1a illustrates just one example of an end user device that may be used, and the devices used may vary, and are secondary to the functionality that they provide, as further described herein.

Aspects of the present disclosure are directed towards data interleaving, which may be include in the physical layer of DOCSIS to reduce the effect of burst errors on downstream data. However, the teachings of the present disclosure may provide utility in other data distribution areas subject to burst errors, such as radio communications. For example, embodiments include equipment used for transmissions between cellular towers and radio receivers. In these embodiments, the cellular tower(s) would take the place of centralized router 20, and the radio receivers (such as cellular phones, smartphones, aircards, etc.) would take the place of end user devices 24.

Figure 2:
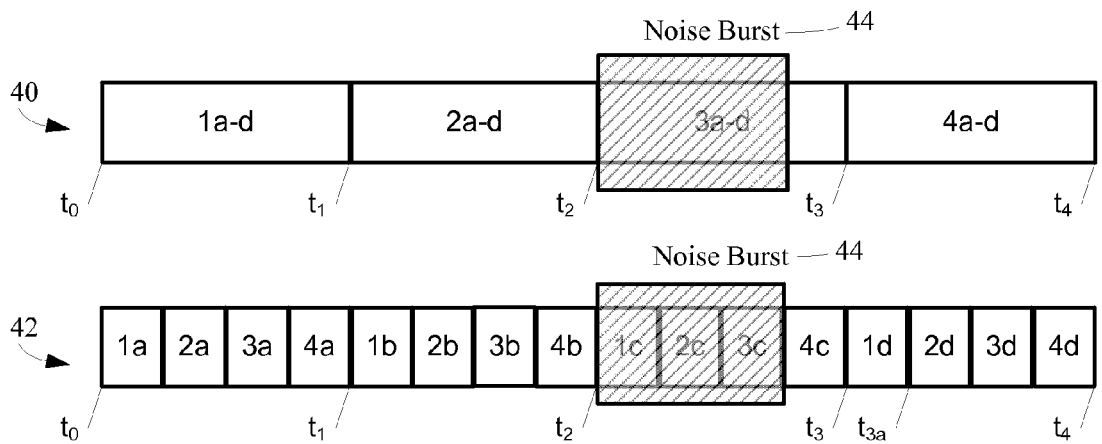
FIG. 2 illustrates an example of interleaving showing burst noise.

FIG. 2 shows an example of interleaving. In this example, data stream 40 includes four data packets (labeled 1 through 4, each divided into subparts a-d) that may be streamed to a plurality of end user devices such as four receiving modems. If noise burst 44 interferes with the appropriate modem's reception of packet 3, the data in the packet may be unrecoverable. As shown, noise burst 44 interfered with approximately 75% of the data in packet 3, which, in this example, is too much interference for the forward error correction to repair.

Interleaving is a form of error protection. It re-organizes the transmitted data in order to distribute interference from burst noise across packets. By doing so, fewer packets are so corrupted that the interference cannot be reversed by error correction. Therefore, the amount of data lost or requiring retransmission is reduced.

As shown in FIG. 2, each data packet of data stream 40 may include four segments, for example, labeled a, b, c, or d. These segments may be interleaved in data stream 42. The interference from noise burst 44 is spread over segments 1c, 2c, and 3c of data stream 42. Thus, noise burst 44 interferes with approximately 25% of packet 1, 25% of packet 2, and 25% of packet 3. In this example, this amount of interference is correctible by the forward error correction, such as Reed Solomon coding, utilized within the packets. Unlike the result with data stream 40, noise burst 44 does not cause any of the transmitted data to be lost in data stream 42.

Interleaving a greater number of packets (or other sets of data segments) increases the distance in the data stream between segments belonging to the same packet. Higher interleave depths therefore increase the amount of burst noise that is correctable.

Interleaving increases latency in data delivery. For example, in data stream 40 of FIG. 2, packet 1 is fully delivered by time $t_1$. In the interleaved data stream 42, packet 1 is delivered in smaller amounts over time, and the entire packet is not delivered until time $t_{3a}$. The interleaved segments of data are checked for errors and passed up to a higher protocol layer only after an entire packet is received.

Figure 3:
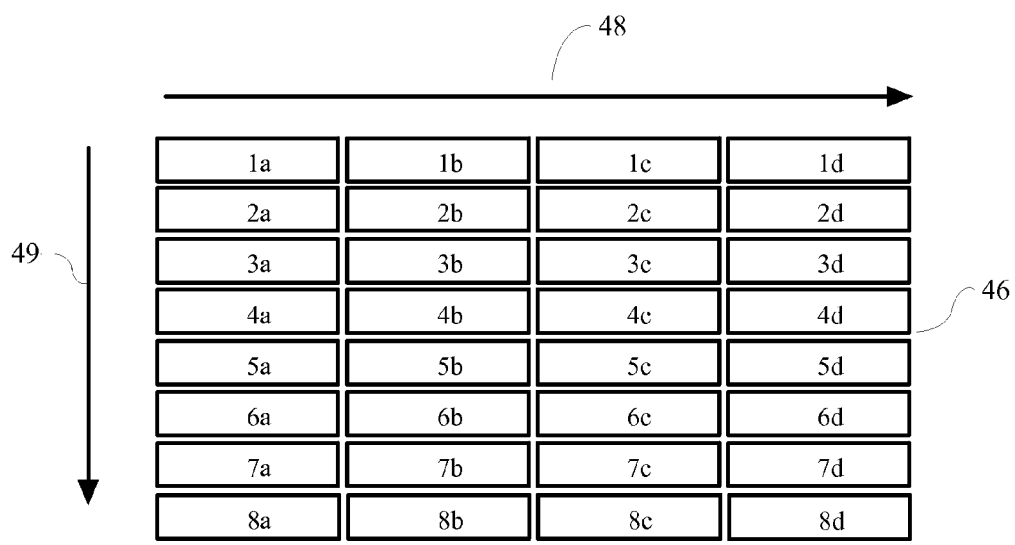
FIG. 3 illustrates an example of an interleaving processing.

FIG. 3 illustrates interleaving where all sets have the same interleave depth. In this example, each set of segments is destined for one of eight modems. The data transmitting device (such as the centralized router 20) inserts data into a table structure 46. The data is inserted by rows, as indicated by arrow 48. In this example, each slot in the table holds a segment, and the entire set of segments is spread across the cells in a row. Each segment is numbered by which set it belongs to, and the segments of a set are lettered a, b, c, or d.

The data in table 46 is transmitted by reading the data segments out by columns, as indicated by arrow 49. In other words, each slot in the table corresponds to a timeslot in the data transmission. Therefore the data transmission in this example includes data segments in the following order: 1a, 2a, 3a, 4a, 5a, 6a, 7a, 8a; 1b . . . 8b; 1c . . . 8c; 1d . . . 8d. On the receiving side, the CM may reconstruct the transmitted sets of segments by inserting the received data segments into table structure 46 by column (arrow 49), and then reading the data out by row (arrow 48). Alternatively, if only certain time slots correspond to data for receipt by a modem, the modem may save only the data received during those timeslots and discard the rest. If the modem does receive multiple data streams, it may also place the data received at each timeslot into a list, such as a queue.

In FIG. 3, each pair of segments transmitted to the same modem is separated by seven other segments. For the purposes of this document, this will be called an interleave depth of 8. In this example, the interleave depth may be one more than the number of unrelated segments transmitted between two related segments (such as segments having the same destination). The example in FIG. 2 has an interleave depth of 4. If each pair of segments transmitted to the same modem is separated by one other segment, the interleave depth is 2. If each pair of segments is not separated at all, the interleave depth is 1.

The interleave depth may be static and set by centralized router 20 for all downstream devices. However, it may be advantageous to allow centralized router 20 to use more than one interleave depth at a time. For example, it may be the case that only a portion of the modems connected to centralized router 20 suffer from significant interference. For this portion, the reduced likelihood of uncorrectable errors associated with higher-depth interleaving may increase the overall speed of data transmission.

A second portion of the modems connected to centralized router 20 may suffer from only minimal interference. For this second portion, higher-depth interleaving may not significantly increase the overall speed of data transmission because few retransmissions would be needed even with lower-depth interleaving. Thus, reducing the interleave depth in order to reduce latency may be advantageous.

Different portions of a network may experience differing amounts of burst noise for several reasons. Examples include differing lengths of wire serving various network segments, proximity to sources of noise, sensitivity of modems 24, shielding, etc.

According to one or more embodiments, the interleave depth may be set differently for various modems 24 in the cable data network 22. The interleave depth may be set for individual modems, or for various groups of modems. Also, interleave depths may be set and changed dynamically. By monitoring modem performance, an embodiment can determine if increased noise is interfering with traffic, requiring a greater interleave depth. If noise has not affected throughput, the interleave depth classification can be lowered for one or more modems, thereby lowering latency for those modems.

Figure 4A:
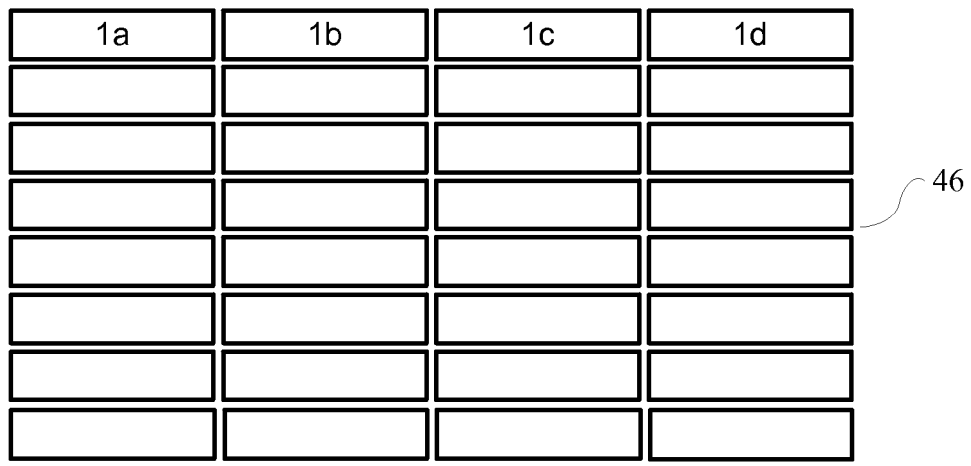
FIG. 4a-e illustrates how data segments may be placed in a table at various interleaved depths.
Figure 4B:
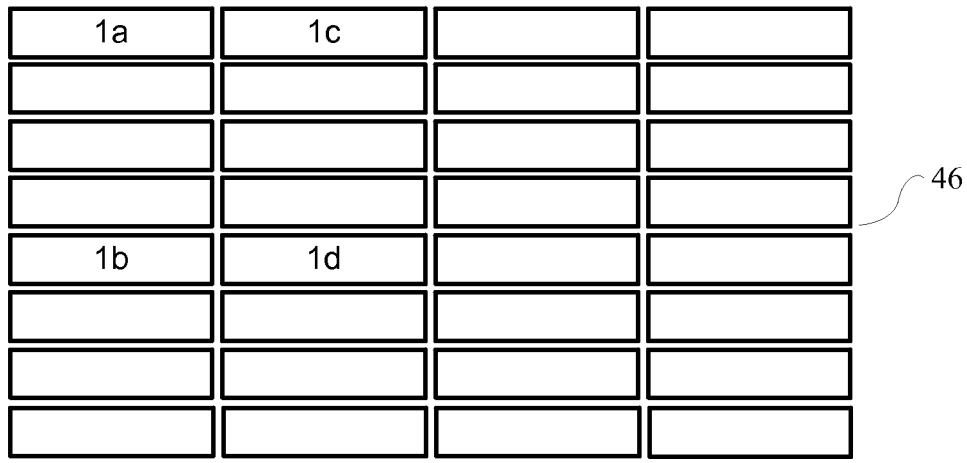
Figure 4C:
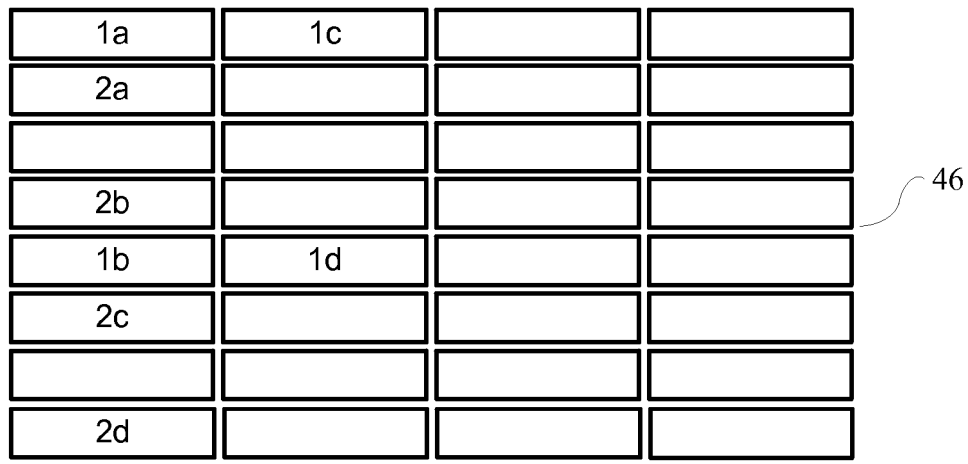

As discussed previously with respect to FIG. 3, interleaving may be accomplished by placing data into a table and then reading it back out. FIG. 4a illustrates the result of inserting set 1 into table 46 at an interleave depth of 8. Counting column-wise, there are seven empty slots between each segment of packet 1. FIG. 4b illustrates the result of inserting set 1 into table 46 at an interleave depth of 4. Counting column-wise, there are three empty slots between each segment of set 1. FIG. 4c illustrates the result of inserting set 2 into table 46 at an interleave depth of 2 after set 1 has already been inserted at an interleave depth of 4. There is one slot between each segment of set 2.

Figure 4D:
Figure 4E:

Using the same segments and table as above, if a set has an interleave depth equal to half the number of rows in the table, it only fills half of the columns in the table. Therefore, two sets would be needed to fill an entire row. FIG. 4d shows a table where two sets (2a-d and 3a-d) fill an entire row. Two sets are required because the interleave depth used to insert the segments was four—half of the number of rows in the table. Four sets would be required in order to fill a row at interleave depth 2, as shown in FIG. 4e.

Figure 5:
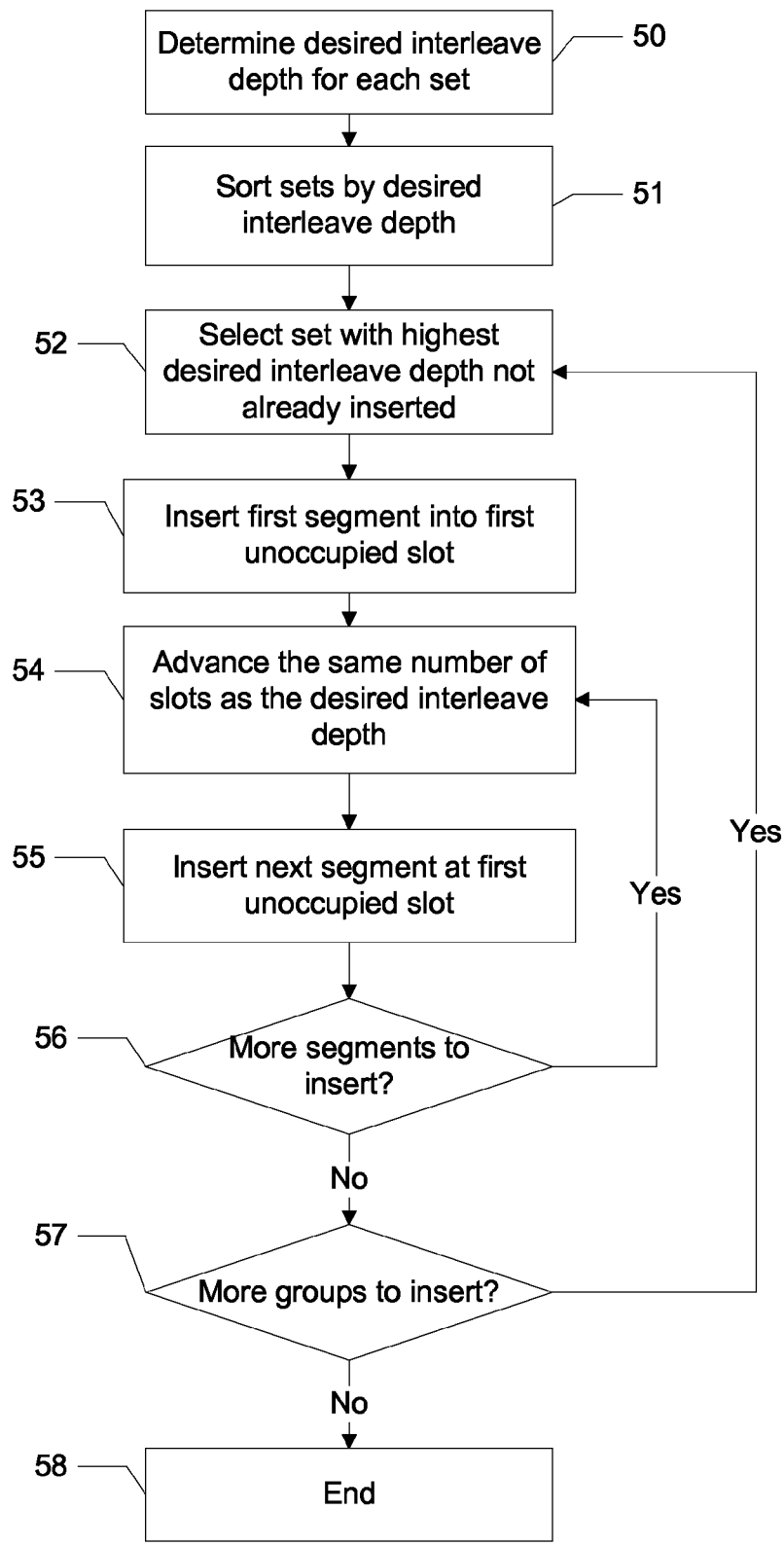
FIG. 5 is a flowchart for a process for interleaving according to one or more embodiments.

One exemplary method of inserting segments into tables is shown in FIG. 5. In step 50, the desired interleave depth associated with each set of segments is determined. In optional step 51, the sets of segments are sorted by desired interleave depth. In the event that more than one set has the same associated interleave depth, a simple tiebreaking rule may be used to determine the next set. For example, the sets with the same desired interleave depth may be sorted by the identifier associated with the modem to which the sets are to be sent. In some applications, no tiebreaking rule is required and the sets of the same depth may be chosen arbitrarily.

In step 52, the largest set that has not already been inserted is selected for insertion. In step 53, the first segment of the selected set is inserted into the first unoccupied slot in the table. After advancing the appropriate number of slots for the desired interleave depth (step 54), the next segment is inserted into the first unoccupied slot in step 55. Segments may be inserted at an interleave depth that is higher than the desired interleave depth if the first slot into which a segment would have been inserted is already occupied. Advancing past the last slot in the table returns to the first slot in the table. If the method does advance past the last slot in the table during steps 54 or 55, then segments may be inserted into the table out of order. They may also be inserted at an interleave depth that is lower than the desired interleave depth.

As shown by decision 56, steps 54 and 55 repeat until all of the segments in a set have been inserted. Then, the process is repeated for the next set of segments, as illustrated by decision 57. When all of the sets have been inserted, the method ends at step 58.

Once the table has been constructed, by, for example, the method of FIG. 5 or another method, the table may be transmitted. Prior to transmission, any unused cells may be flagged or set to zero. The table may also be initialized to a flag or zero value prior to beginning the method of FIG. 5 or any other method of constructing the table. During transmission, the flags or zero values may be transmitted. Alternatively, the transmission may skip unused cells. However, skipping unused cells may result in a lower interleave depth than the desired interleave depth. Finally, if any segments were inserted out of order, the segments of that set may optionally be re-arranged so they will be transmitted in order. Similarly, the table may be transmitted in reverse order or beginning with the rightmost column instead of the leftmost column.

It is to be understood that the table data structure identified throughout this document, such as table 46, is described as such only for clarity of explanation. The structure may be viewed as data structures other than a table. For instance, by placing the columns (or rows) of a table end to end, the identical structure may be viewed and stored as a list, such as a queue or a stack. Similarly, groups of slots or cells within a table may each be viewed and stored as separate lists or other data structures.

Although numerous combinations of table size and interleave depth are possible, simplifying the operation of inserting data into the table in an interleaved fashion is advantageous in some applications, such as where processing power is limited. As such, in the following example the maximum interleave depth may be limited to the number of rows in the table; the number of rows in the table is a power of two; and the available interleave depths are powers of two. Finally, each packet (or other segmented piece of data) in this example is broken into a number of segments that is a power of two, and the number of columns in the table is a multiple of the number of segments.

Figure 6:
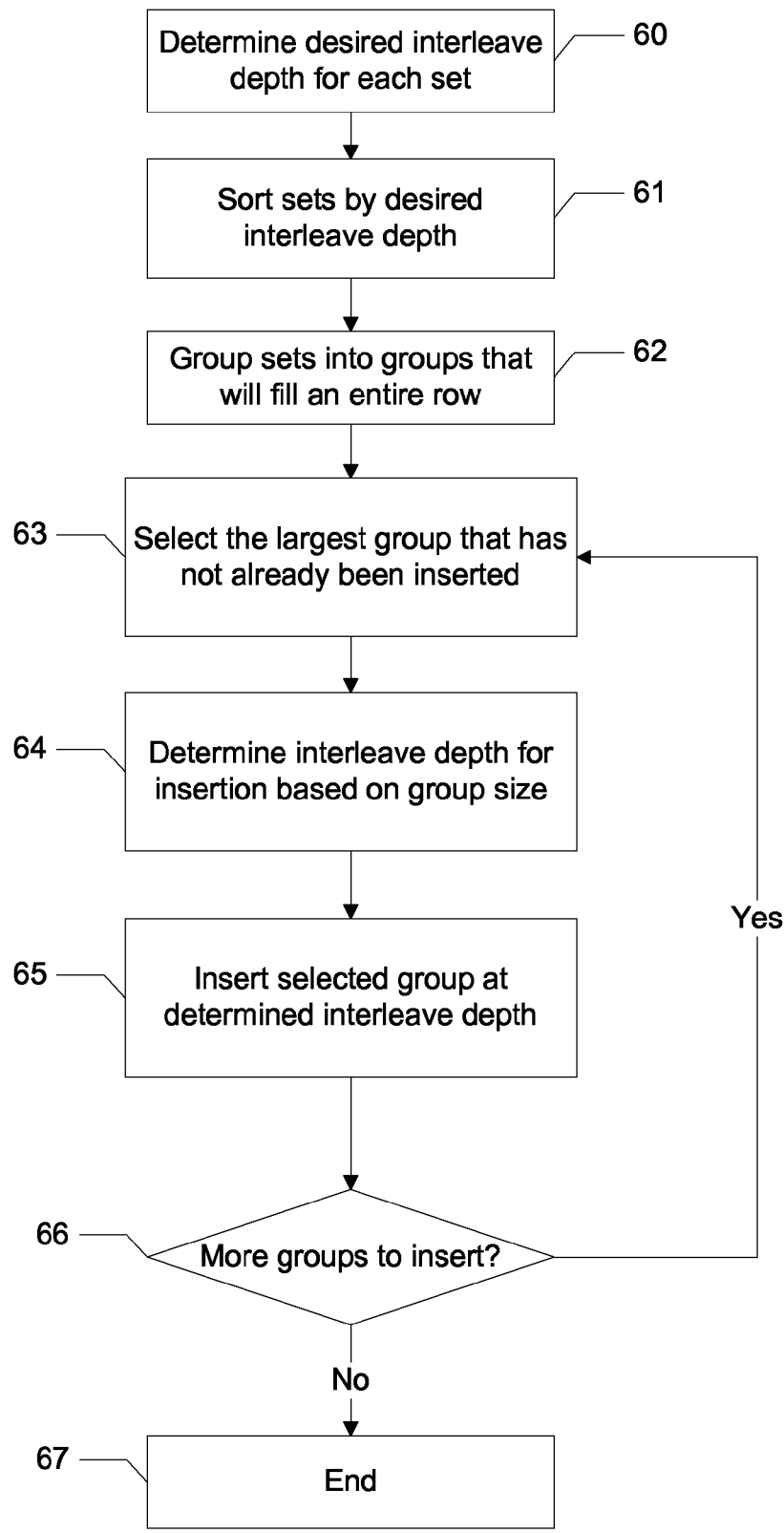
FIG. 6 is a flowchart for adjusting interleave depth for according to one or more embodiments.

Given these constraints, the method of FIG. 6, which is an alternative to the method of FIG. 5, allows segments to be inserted into a table in order to achieve a desired minimum interleave depth for each set of segments. In other words, the method of FIG. 6 will insert segments into a table at the desired interleave depth or a higher interleave depth. First, in step 60, the desired interleave depth associated with each set of segments is determined. In optional step 61, the sets are sorted by desired interleave depth. In the event that more than one set has the same associated interleave depth, a simple tiebreaking rule may be used to determine the next set. For example, the sets with the same desired interleave depth may be sorted by the identifier associated with the modem to which the sets are to be sent. In some applications, no tiebreaking rule is required and the sets of the same depth are chosen arbitrarily.

In step 62, the sets are grouped into groups that will fill an entire row. For example, if each set consists of four segments, and the table has four columns, then a single set will fill an entire row if its interleave depth is equal to the number of rows in the table, as shown in FIG. 4a.

If the number of columns is a multiple of the number of segments, the number of sets needed to fill a row would increase accordingly. For example, if the segments above were inserted into an 8×8 table, twice as many sets would be needed for each interleave depth. For clarity of explanation, the examples in this document keep the number of columns equal to the number of segments per set.

Figure 7A:
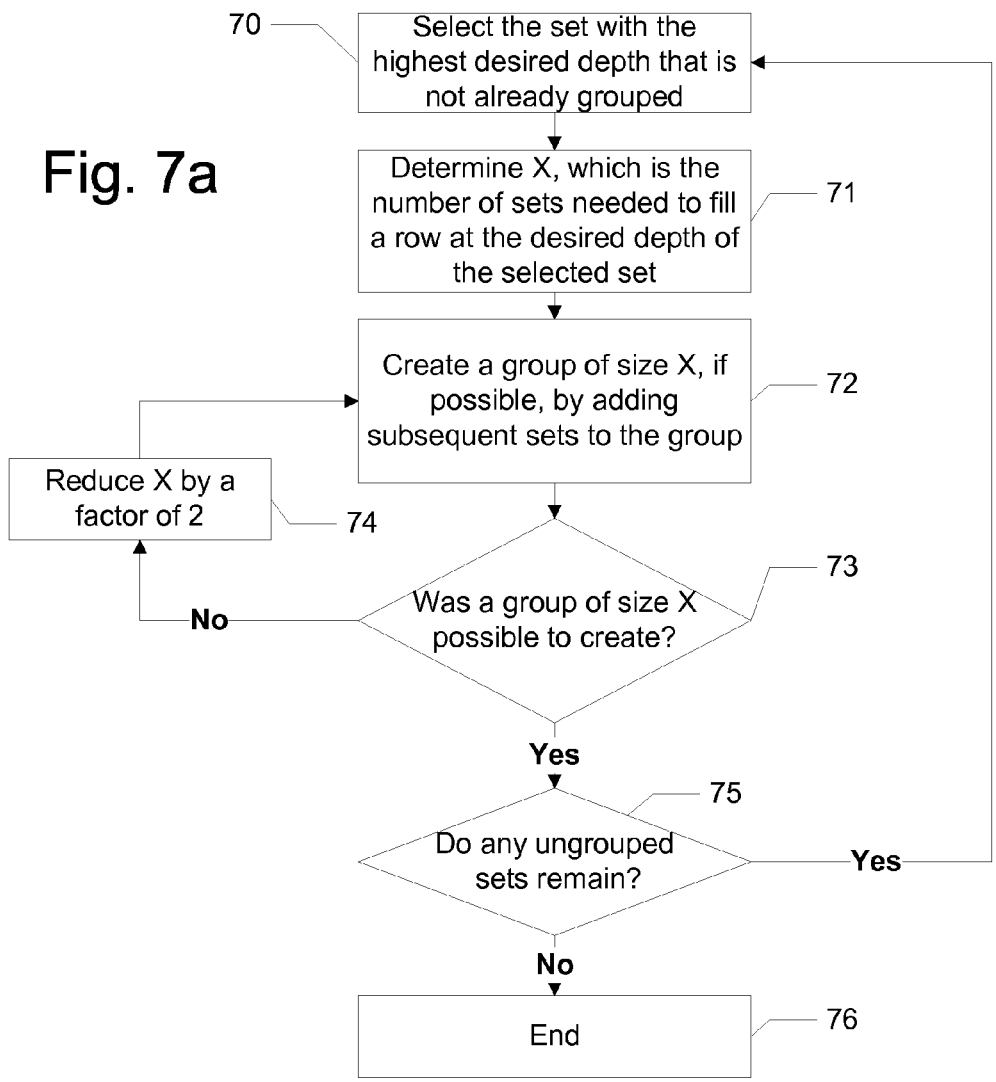
FIG. 7a is a flowchart for a method of grouping sets of data segments according to their desired interleave depths.
Figure 7B:
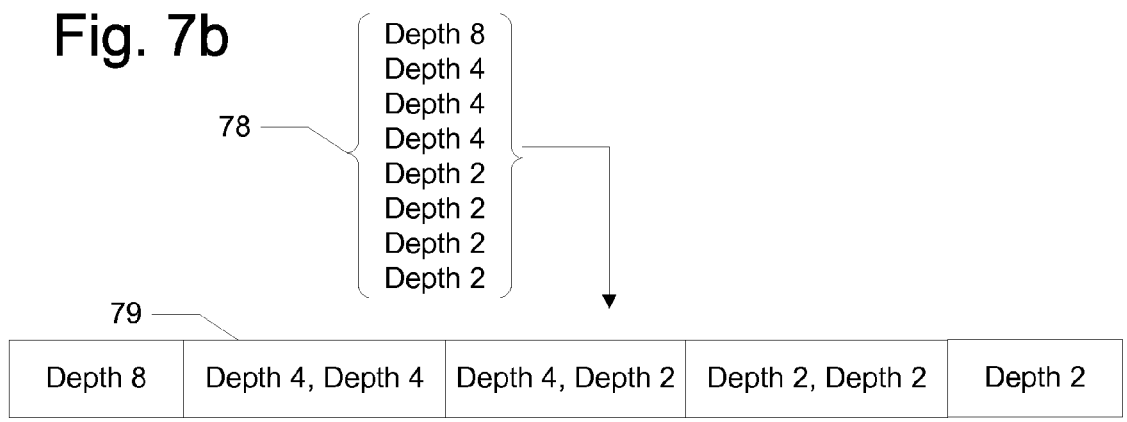

Returning to step 62 of FIG. 6, in order to group the sets into groups that will fill an entire row, the method of FIG. 7a may be used. Applying this method to the sets shown in element 78 of FIG. 7b results in the groups shown in element 79, assuming an 8-row table is used. First, in step 70, the set with the highest desired depth that is not already grouped is selected. In the example of FIG. 7b, this is the set with a desired depth of 8.

In step 71, the number of sets needed to fill a row at depth 8 is determined. Because the table has 8 rows, and because the number of columns is equal to the number of segments in this example, X equals 1. (In step 71, X equals the number of rows divided by the desired depth, times the ratio of the number of columns in the table to the number of segments per set, which is 1 in the examples given.) In step 72, a group of size 1 is created. The group contains the set with a desired depth of 8.

Because ungrouped sets remain, step 70 is now repeated. A set with a desired depth of 4 is selected. In step 71, X equals 2 because 8 rows divided by a depth of four equals 2. In step 621, a group containing two sets of depth 4 is created.

Ungrouped sets remain, so step 70 is now repeated. The final set with a desired depth of four is selected. As determined in step 71, X equals 2 for this set. In step 72, a group of size 2 is created for this group. It contains the selected set of desired depth 4 as well as the next largest set, which is one of the sets with a desired depth of 2.

Step 70 is now repeated for a fourth time because ungrouped sets still remain. A set with a desired depth of 2 is selected. As determined in step 71, X equals 4 for this set. In step 72, no groups are created. This is because only three groups remain that have not already been grouped. In decision 73, a flow moves to step 74, where X is reduced to 2. Now, in step 72, a group of size 2, is created.

Step 70 is now repeated one last time because a single set of desired depth 2 remains ungrouped. X equals four after step 71. No groups are created in step 72 because there are not four sets remaining. X is reduced to 2 in step 74, flow returns to step 72. No groups are created again, so X is reduced to 1 in step 74. Step 72 is repeated, and a group containing only the last set of desired depth 2 is created. At this point all of the sets have been grouped, so the method of FIG. 6a has been completed.

Figure 8A:
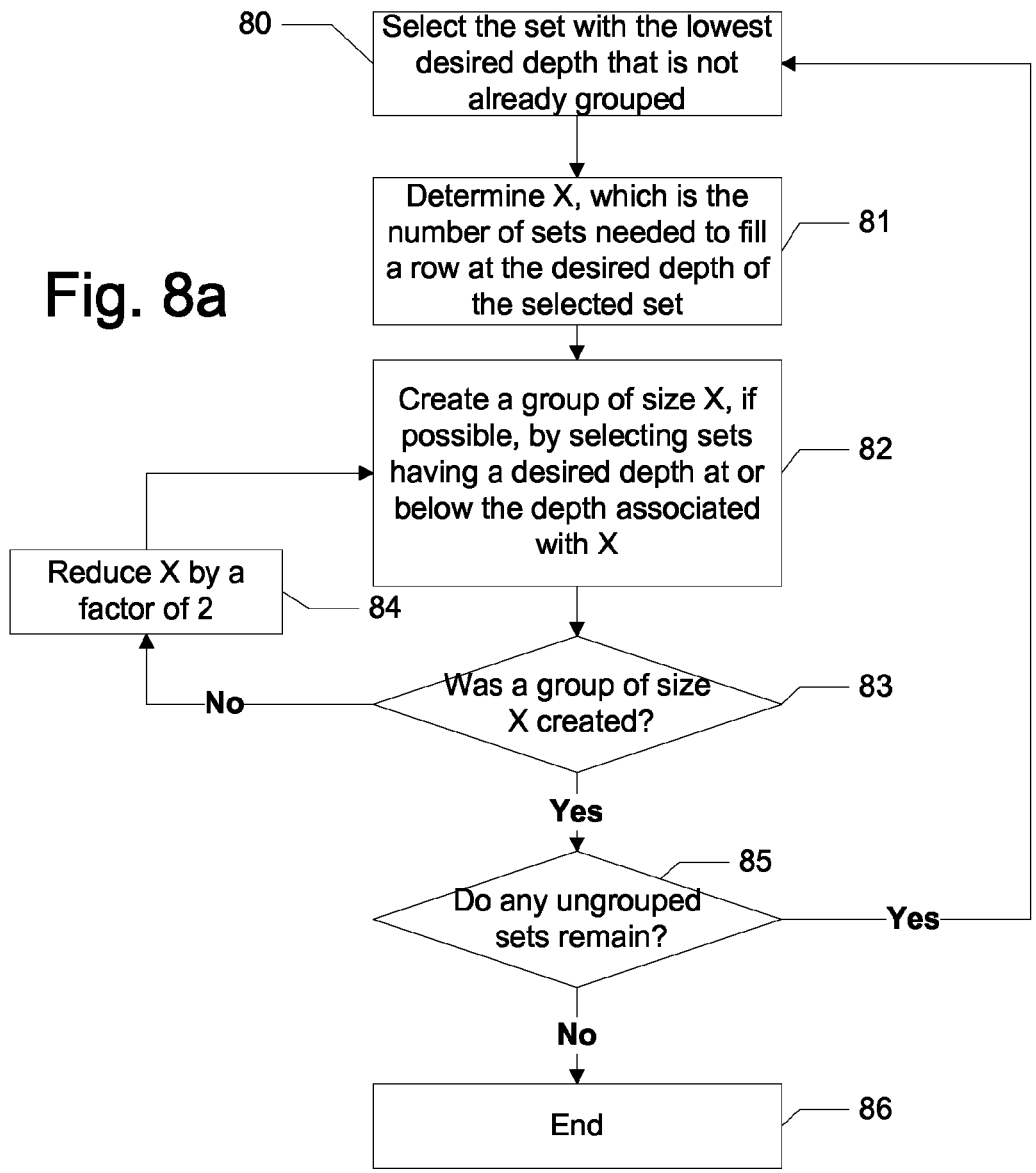
FIG. 8a is a flowchart for another method of grouping sets of data segments according to their desired interleave depths.
Figure 8B:
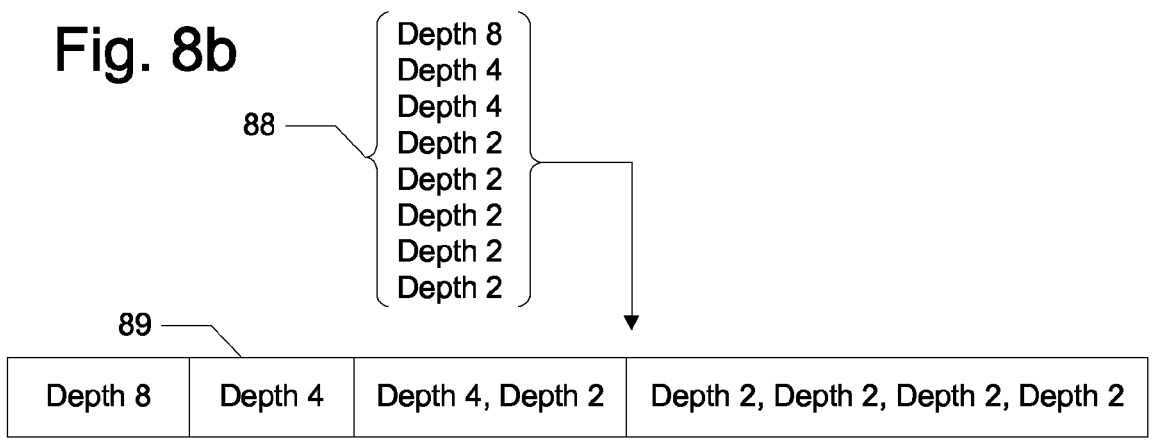

An alternative method for grouping sets is shown in FIG. 8a. The sets to be inserted into an 8-row table may be represented as element 88 of FIG. 8b. In step 80, the set with the lowest desired depth that is not already grouped is selected. In this example, this is one of the sets of desired depth 2. In step 81, X is determined to be 4 because 8 rows divided by a depth of 2 equals 4. (In step 81, X equals the number of rows divided by the desired depth, times the ratio of the number of columns in the table to the number of segments per set, which is 1 in this example.) In step 82, a group of size four is created. This group is the rightmost group shown in element 89 of FIG. 8b.

Because ungrouped sets remain, step 80 may be repeated, and the final set of desired depth 2 is selected. In step 81, X is determined to be 4. In step 82, no groups are created because the next available group has a desired depth of four, which is higher than the maximum depth of 2. In exemplary embodiments, groups are only created in step 82 if all of the elements of the group have a desired depth at or below the depth associated with X. Here, that depth is 2. (The associated depth is found by taking the number of rows, dividing it by X, and multiplying by the ratio of the number of columns in the table to the number of segments per set.) Because no groups of size 4 were created, X is reduced to 2 in step 84 and step 82 is repeated. This time, a group containing the group of desired depth 2 and a group of desired depth 4 is created.

Because ungrouped sets remain, the above steps are repeated. The final group of desired depth 4 is selected in step 80. X is determined to be 2 in step 81, but no groups are created in step 82 because the remaining group's desired depth of 8 is too high. X is reduced to 1 in step 84, and a group containing only one set of depth four is created.

Finally, the above steps are repeated one last time, resulting in a group containing only the remaining set, whose desired depth is 8. Because no ungrouped sets remain, the method has completed.

The methods of FIGS. 7a and 8a may produce different groupings for the same set of input data. The method of FIG. 7a is somewhat simpler. On the other hand, the method of FIG. 8a will not place the sets with the lowest desired depth into a smaller group than is necessary. This may be advantageous because smaller groups correspond to higher interleaving depth, and therefore increased latency.

Returning again to FIG. 6, recall that the sorted sets are grouped in step 62. This may be accomplished using the methods in FIGS. 7a and 8a, or it may be accomplished by another method. For this example, assume that method of FIG. 8a was used, resulting in the groups shown in FIG. 8b.

In step 63, the largest group that has not already been inserted into the table is selected. Here, that group is the rightmost group in element 89, which contains four sets. In step 64, the interleave depth at which to insert the group is determined. The interleave depth is computed by dividing the number of rows in the table by the size of the selected group, times the ratio of the number of columns in the table to the number of segments per set. Here, 8 rows divided by a group size of 4 gives an interleave depth of 2. In step 65, all of the elements in the selected group are inserted into the table at an interleave depth of 2. This means that the first, third, fifth, and seventh rows of the table will be filled. Inserting elements into the table may be accomplished as follows. The first segment of the group is inserted into the first available slot. Each subsequent segment is inserted into the slot that is as distant from the previous slot as the interleave depth dictates. Because the interleave depth is 2 in this example, every other slot will be used.

Steps 63, 64, and 65 will be repeated until there are no more groups to insert. The group containing two sets, one of desired depth 2 and one of desired depth 4 will be inserted next. Because the group size is only two, this group will be inserted at an interleave depth of four. The desired depth of the sets contained in the groups has no impact on the interleave depth used in this example. The selected group will be inserted into the first available rows, which in this example are the second and sixth rows. (The fourth row is skipped because inserting data into both the second and fourth row would represent an interleave depth of two, not four.)

The final two groups, which each contain only one set, will be inserted into the two remaining rows in the table. They will be inserted at an interleave depth of eight because each group contains only one set. At this point there are no more groups to insert, and the method is complete.

Once the table has been constructed (such as by the method of FIG. 5 or FIG. 6), the embodiment, such as a centralized router, may read from the table column-by-column in order to transmit the data in an interleaved fashion. Note that while the data for transmission may be included in the table, pointers to that data may also be used. In other words, each data segment may contain one or more pointers to the data to be transmitted during the timeslot associated with the slot in the table.

Alternatively, the table may be constructed from a simplified set of data. For example, the sets used to construct the table may be made up of segments that each identify a recipient or data stream. The result is a table that identifies a recipient or data stream in each slot. This table may then be used to send data corresponding to the identified recipient or data stream in each timeslot.

The recipients of the data sent by the centralized router must have some way of identifying which segments should be pieced together into a data stream, and which segments should be ignored (or placed into a different data stream). Thus, the data recipients, such as the modems, must know the structure of the table in order to be able to make sense of the data being sent according to the table. Providing this map to the data recipients may be accomplished in at least two ways.

First, the device that sends the data may send out a map that indicates which recipient each time slot is intended for. The map may be constructed by applying the method of FIG. 5 or FIG. 6, as described above, and transmitting the resulting table of recipients. Instead of segments of packets, each slot in the resulting table may indicate the intended recipient for which the data that will later be included in the corresponding timeslot is intended. Recipients may ignore the data received in timeslots associated with other recipients.

Alternatively, each slot in the resulting table may include a number, each number corresponding to a data stream. The recipient may then use the numbers in the map to reconstruct all of the received data. Which data should be kept and which data, if any, should be discarded is then determined from the data itself. For example, if the data is or contains IP packets, then the destination address of the IP packets may be checked.

An additional method of sending a map may include broadcasting a list of the recipients and the desired interleave depths of each recipient. The recipients may use this information to construct a table. The sender and recipient must use identical methods or methods that produce identical results in order to ensure the constructed table matches the table used by the sender. For example, the method of FIG. 5, FIG. 6, or a similar method may be used.

No matter which type of map is used, an updated map must be distributed to the recipients whenever the interleave depths used to send data to a recipients change. This may be accomplished by periodically transmitting the map to all recipients. A similar mechanism is already used in the DOCSIS specification to periodically send data that controls when modems may transmit.

One or more embodiments may determine how to dynamically set the interleave depth for each recipient. In one embodiment, the centralized router may broadcast to all connected modems the current allowable interleave depths supported, along with the interleave depth each modem should first attempt to use. In other embodiments, the supported interleave depths and default desired interleave depth may be predefined. In yet another embodiment, the initial desired interleave depth may be requested by the modem instead of dictated by the centralized router. In a further embodiments, the modem may be unaware of the default desired interleave depth being used, but it may provide indications to the centralized router as to whether a higher or lower depth should be used.

Either the recipient, such as the modem, or the sender, such as the centralized router, may keep track of the rate at which errors are encountered. Errors include data corruption that is so extensive so as to be beyond repair by forward error correction. Other errors, such as errors that can be repaired by forward error correction may also be used. The recipient may increment a counter upon receiving an error. If the counter increases too fast with time, then this result may be reported to the sender. Alternatively, a request for a higher interleave depth may be sent. If the counter increases very slowly, then this result may be reported to the sender, or a lower interleave depth may be requested.

The sender may keep track of the rate at which errors occur by receiving counts of errors from recipients, as described above. The sender may adjust the desired interleave depth for each recipient in response to this data. Alternatively, the sender may allow the recipients to report their own desired interleave depths. The sender may honor all requests, or the sender may honor only certain requests to change the desired interleave depth.

In one embodiment, each modem keeps a counter of the number of packets that are unrecoverable even after error correction. Once this number reaches a threshold level, the modem sends a message to the centralized router alerting it to the number of unrecoverable packets. The centralized router confirms receipt of the message and the counter is set back to zero, unless there were packets lost in the time it took the modem to report to the centralized router, in which case it is reset to that number. If the threshold level for reporting is too small, the modem may report dropped packets too often, consuming needless traffic. If the threshold level is too large, changes in interleaving depth may be slow to arrive after conditions change. The threshold level may be set by the modem user, the centralized router, or both.

In some embodiments, the initial interleave depth is initially set higher than is necessary, and it is reduced over time until an acceptable rate of unrecoverable errors is reached. The sender may query the receivers that have not reported their above mentioned counter, yet remain online. The sender may, start, for example, with the receivers that have not reported an error count for the longest period of time. The sender may then verify that the receivers support variable interleaving and are correctly tracking dropped packets before adjusting the receivers' interleave depth. Alternatively, the sender may lower a receiver's interleave depth if an error count is not received for a certain period of time or after a certain amount of data has been transmitted.

One way to verify that a specific receiver is correctly tracking its dropped packets is to query the receiver to get a count of dropped packets. At this point the receiver may be configured to clear its counter. The sender may then intentionally send a packet with bad data (e.g. a bad checksum) to that receiver and then query it again. This would verify that the receiver is correctly identifying uncorrectable packets, and recording them.

The sender may collect this data and be able to analyze it over time, for example, using a statistical analysis to detect nodes and/or modems with burst errors. It may also record the time the receiver came online (when it first started the counter), and the last time the particular receiver last reported its statistics (when it last reset its counter). With this information the sender may determine if the desired interleave depth should be increased, decreased, or left untouched.

One benefit of embodiments that have the sender manage the desired interleave depths is that the sender can change those depths proactively. For example, if there is a network-wide event, a branch wide event, or a node wide event, such as a suddenly high rate of errors from multiple receivers, the sender may temporarily raise or lower every receiver's interleave depth associated with the burst errors. This may be done with the sending of a burst error adjustment command for dynamically changing the interleave depth and may include an associated data structure (e.g., a table). Where the recipients are aware of their interleave depths, (as opposed to requesting only increases or decreases in the depth), a single broadcast message to every receiver, groups of receivers, and/or geographically related receivers on the network that supports variable interleave depth may be used to change each receiver's desired depth. The sender and/or the receiver may store the interleave depth values from prior to the event. This would facilitate reversion to the previous values after the event passes.

Interleave depths may also be adjusted in response to additional statistics, such as the rate of pre-errors (errors before error correction), the rate of post-errors (errors that still exist after error correction), the ratio of pre-errors to post-errors, or the frequency of noise bursts present in the system. Also, the default desired interleave depth may itself be dynamically adjusted in response to the desired interleave depths of recipients that have already adjusted from the default.

Figure 9:
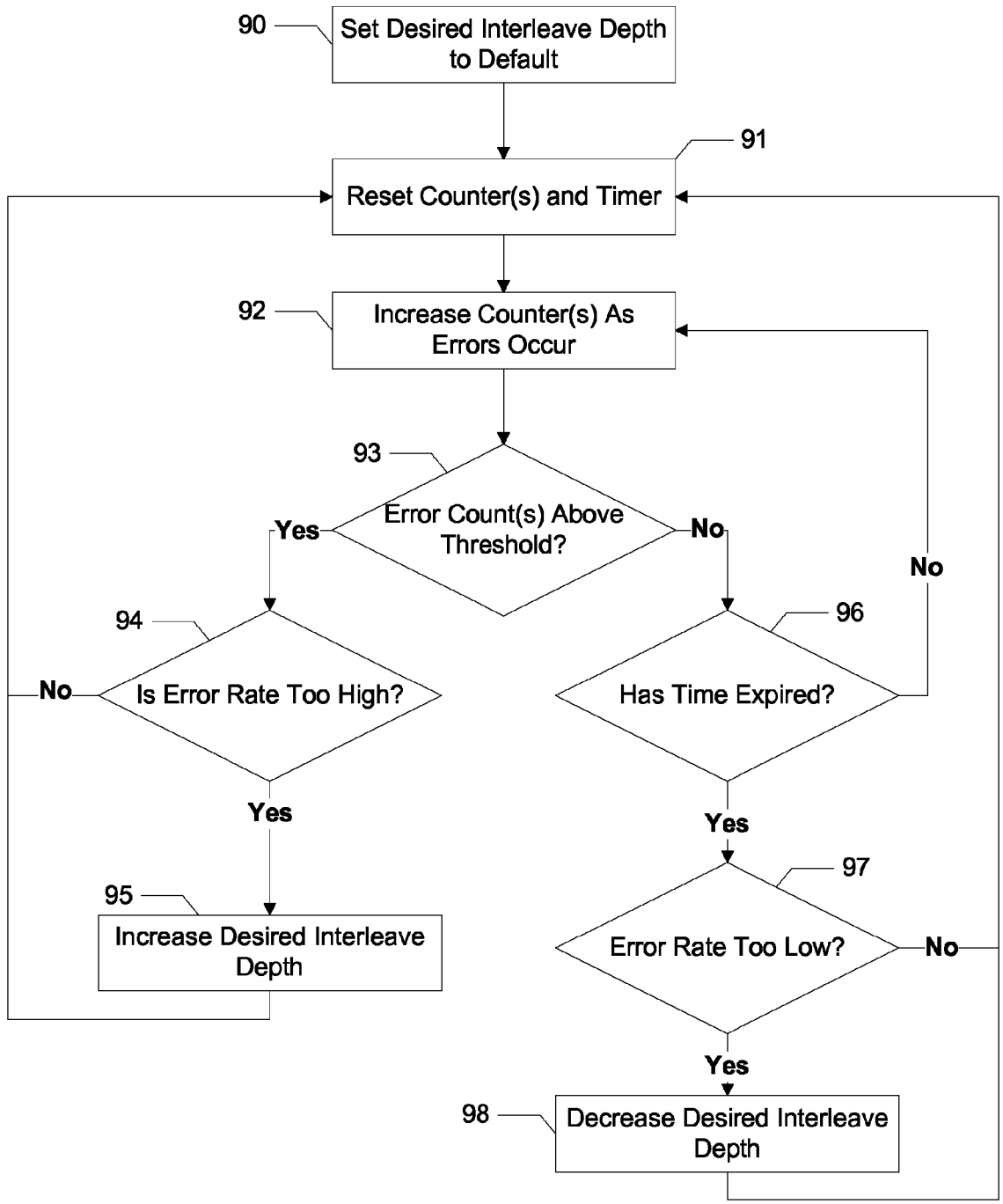
FIG. 9 is a flowchart for a method of adjusting the desired interleave depth of a data recipient.

FIG. 9 shows an exemplary process that may performed by one or more embodiments to adjust the desired interleave depth for a particular data recipient. If the process is performed at the data recipient, then adjustments to the desired interleave depth may be transmitted to the sender for use in updating the map. In step 90 the desired interleave depth is set to a default value. In step 91, a counter and an associated timer are set to zero. A timer may literally be set to zero and incremented with time, or a start time may be recorded. In step 92, the counter is increased when errors are detected. The counter may count post-errors, but as described above, pre-errors or other indications of burst noise may be tracked instead of or in addition to post-errors.

Once at least one error counter is above a threshold value, as determined in step 93, the error rate is determined in step 94. The error rate may be determined relative to time. Alternatively, the rate of post-errors relative to pre-errors may be determined, or any other indicator of resilience to burst noise may be used. If the error rate is determined to be too high, then the desired interleave depth is increased (if possible) in step 95. If the error rate is not too high, then the counter(s) and timer are reset in step 91 without adjusting the desired interleave depth.

If the rate at which errors occur is very low, then it may take a long time for the error count(s) to reach a threshold. Therefore, in step 96 and 97, the error rate is determined once a predetermined amount of time has elapsed from the last time the counter was reset. If the error rate is determined to be too low in step 96, then the desired interleave depth is decreased in step 98. If the error rate is not too low, then the counter(s) and timer are reset in step 91 without adjusting the desired interleave depth.

Figure 10:
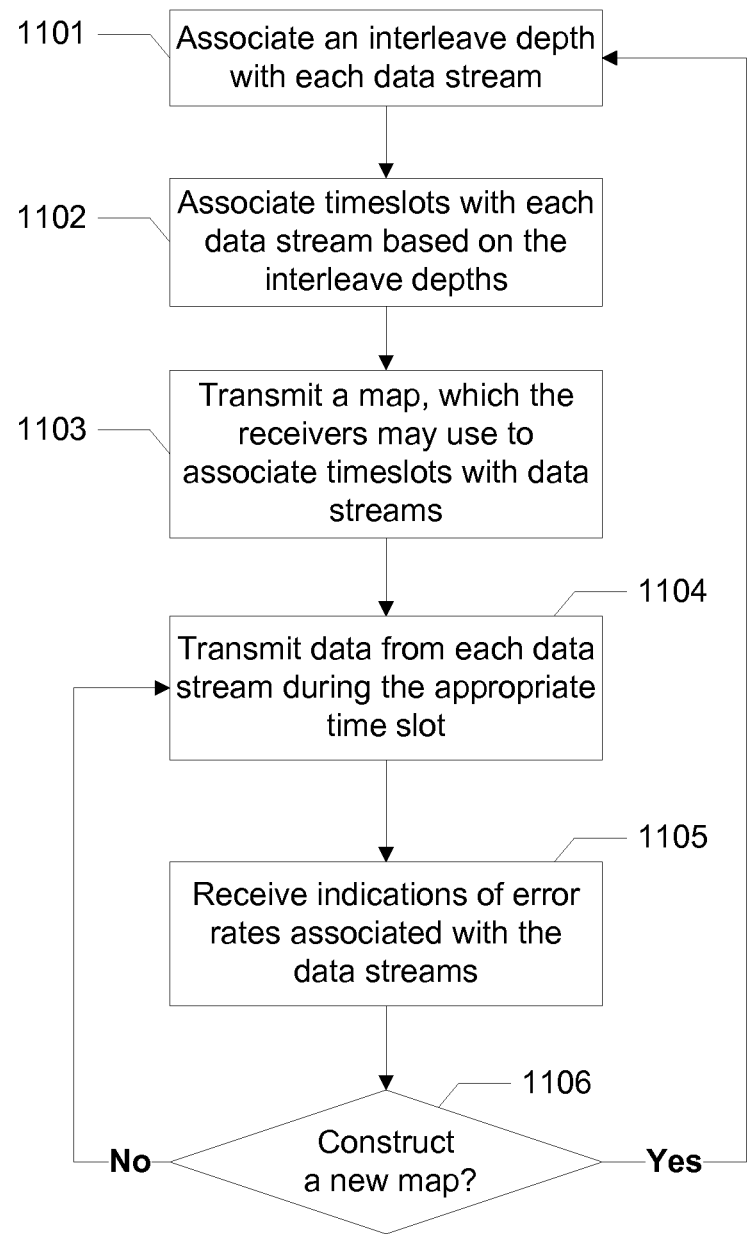
FIG. 10 is a flowchart for a method to transmitting interleaved data streams.

FIG. 10 illustrates an exemplary method that may be employed by one or more embodiments to transmitting interleaved data streams. In step 1101, an interleave depth may be associated with each data stream. In step 1102, timeslots are associated with each data stream based on the interleave depths. Methods for associating timeslots with data streams based on associated interleave depths are described with reference to FIGS. 5 and 6 herein. In step 1103, a map is transmitted to the receivers. The receivers use the map to associate timeslots with data streams. This allows the receivers to reconstruct the data streams from the interleaved transmission. The contents of the map will be described in further detail below. In step 1104, data from each data stream is transmitted in the timeslots associated with the data stream, as determined in step 1102. In step 1105, indications of error rates associated with the data streams may be received. Step 1105 is optional. It may not occur, or it may occur only some of the time. In decision 1106, whether to construct a new map is determined. A new map may be needed if additional data streams are to be transmitted. For example, if a new receiver has joined the network, it may need to receive additional data streams. A new map may also be needed if the interleave depth associated with a data stream has changed. If a new map is to be constructed, step 1101 is repeated. If a new map is not needed, then step 1104 is repeated.

Figure 11:
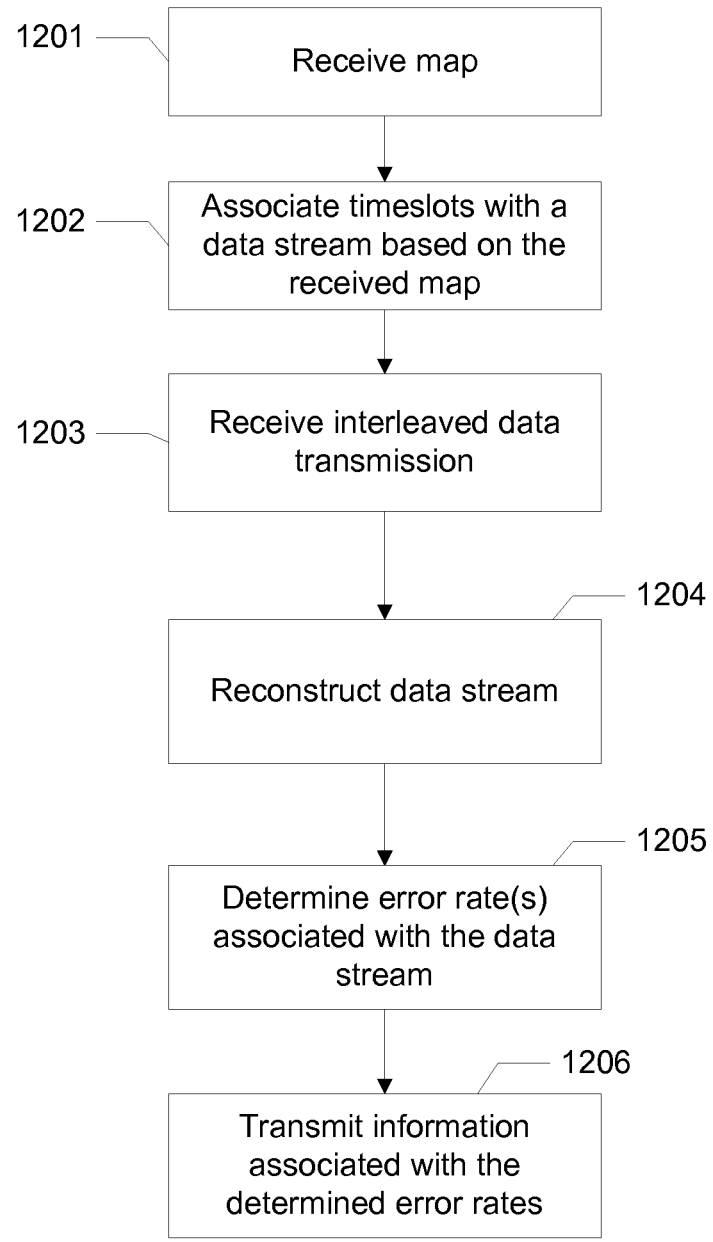
FIG. 11 is a flowchart for a method of receiving a data stream from an interleaved transmission.

FIG. 11 illustrates a method of receiving a data stream from an interleaved transmission. In step 1201, a map may be received. In step 1202, timeslots are associated the data stream to be received. The map may directly or indirectly indicate which timeslots are associated with a data stream, as described further below. In step 1203, an interleaved data transmission is received. In step 1204, the data stream is reconstructed from the interleaved data received in step 1203. This may be accomplished by using the information derived from the map in step 1202, as described further below. In step 1205, one or more error rates associated with the received data stream are determined. Like step 1105, steps 1205 and 1206 are optional. They may not occur, or they may occur only some of the time. The information transmitted in step 1206 may be a request for a new interleave depth. Alternatively, the information transmitted may include one or more error rates or error counts that may be used to determine whether to adjust the interleave depth. A method for adjusting interleave depth is discussed above with reference to FIG. 9.

Although the features herein have been described in with respect to specific examples, there are numerous variations and permutations of the above described systems and techniques that may be made. For example, various steps and elements may be combined, divided, and rearranged as desired. Additional steps and elements may be added and/or inserted among those depicted, and various steps and element may be omitted.

What is claimed is:

1. A method, comprising:
    identifying, by a computing device, a plurality of packets for transmission and a corresponding interleave depth for each of the plurality of packets, wherein each packet, of the plurality of packets, comprises a plurality of segments;
    assigning each segment of the plurality of packets to a different cell, of a plurality of cells of a transmission schedule associated with a plurality of timeslots of a data stream, in descending order of each corresponding packet's interleave depth; and
    transmitting, via the data stream to a user device, one or more segments of the plurality of packets according to the transmission schedule.

2. The method of claim 1, wherein assigning each segment of the plurality of packets comprises:
    assigning a respective plurality of segments of each packet having a higher interleave depth prior to assigning a different respective plurality of segments of each packet having a lower interleave depth.

3. The method of claim 1, wherein assigning each segment of the plurality of packets comprises:
    selecting a first packet, from the plurality of packets, having a highest interleave depth;
    assigning a first segment of the first packet to a first cell of the transmission schedule;
    assigning a second segment of the first packet to a second cell of the transmission schedule, wherein the second cell is a number of cells after the first cell, wherein the number of cells is equivalent to the highest interleave depth;
    determining whether the plurality of segments of the first packet comprises a third segment; and
    in response to determining that the plurality of segments of the first packet comprises the third segment, assigning the third segment to a third cell of the transmission schedule.

4. The method of claim 1, further comprising:
    determining that a first interleave depth corresponding with a first packet, of the plurality of packets, is equivalent to a second interleave depth corresponding with a second packet of the plurality of packets; and
    in response to applying a tie breaking rule, assigning segments of the first packet prior to assigning segments of the second packet.

5. The method of claim 1, further comprising:
    after the assigning, determining one or more cells of the plurality of cells that are unassigned;
    assigning flags to the one or more unassigned cells in the transmission schedule; and
    transmitting, to the user device, the flags according to the transmission schedule.

6. The method of claim 1, further comprising:
    producing a map indicating to which user device of a plurality of user devices each timeslot of the transmission schedule is intended; and
    transmitting the map to the plurality of user devices.

7. A method, comprising:
    identifying a plurality of packets for transmission and a corresponding initial interleave depth for each of the packets, wherein each packet, of the plurality of packets, comprises a plurality of segments;
    grouping the plurality of packets into groups based on their initial interleave depths and a size of a transmission schedule comprising a plurality of cells associated with a plurality of timeslots of a data stream;
    determining a group interleave depth for each group based on a group size of each corresponding group;
    assigning each segment of the plurality of packets to a different cell of the plurality of cells based on each corresponding group's group interleave depth, wherein segments of a packet of a group having a greater group size are assigned prior to segments of a packet of a group having a lower group size; and
    transmitting, via the data stream to a user device, the segments of the plurality of packets according to the transmission schedule.

8. The method of claim 7, wherein the grouping further comprises:

determining a ratio between a row or column size of the transmission schedule and an initial interleave depth of one of the plurality of packets, and wherein the grouping is based on the determined ratio.

9. The method of claim 7, wherein the grouping further comprises:

determining a ratio between a row or column size of the transmission schedule and a number of segments in one of the plurality of packets, and wherein the grouping is based on the determined ratio.

10. The method of claim 7, wherein the grouping further comprises:

determining a first group size based on an initial interleave depth of a first one of the plurality of packets; and generating a first group by appending one or more additional packets to the first one of the packets to meet the first group size.

11. The method of claim 7, wherein the grouping further comprises:

determining a first group size based on an initial interleave depth of a first one of the plurality of packets;

determining that there are insufficient remaining packets to fill the first group; and reducing the first group size by half and attempting to create the first group having the reduced first group size.

12. The method of claim 7, wherein the grouping further comprises grouping packets having a higher initial interleave depth prior to grouping packets having a lower initial interleave depth.

13. The method of claim 7, wherein the grouping further comprises grouping packets having a lower initial interleave depth prior to grouping packets having a higher initial interleave depth.

14. The method of claim 7, wherein a first group interleave depth for a first group is different from a first initial interleave depth for a first packet associated with the first group.

15. The method of claim 14, wherein the first group interleave depth is equivalent to a second initial interleave depth for a second packet associated with the first group.

16. A method, comprising:

identifying, by a computing device, first and second packets having different corresponding interleave depths, wherein each of the first and second packets comprises a plurality of segments;

assigning each segment of the first and second packets to a different cell of a plurality of cells of a transmission schedule using the interleave depth of the second packet, wherein each cell is associated with a different timeslot of a data stream; and transmitting, via the data stream to a user device, the segments of the first and second packets according to the transmission schedule.

17. The method of claim 16, further comprising:

identifying third and fourth packets each having a corresponding interleave depth; and assigning each segment of the third and fourth packets to a different cell of the plurality of cells of the transmission schedule using an interleave depth that is different from the interleave depths of the third and fourth packets.

18. The method of claim 17, further comprising:

grouping the first and second packets into a first group and the third and fourth packets into a second group based on their corresponding interleave depths and a row or column size of the transmission schedule;

determining a first group size of the first group and a second group size of the second group; and determining a first group interleave depth of the first group and a second group interleave depth of the second group, wherein the first group interleave depth is equivalent to the interleave depth of the second packet and the second group interleave depth is different from the interleave depths of the third and fourth packets.

19. The method of claim 18, further comprising:

determining whether the first group size is greater than the second group size; and in response to determining that the first group size is greater than the second group size, assigning segments of the first and second packets prior to assigning segments of the third and fourth packets.

20. The method of claim 18, further comprising:

determining whether the first group size is greater than the second group size; and in response to determining that the first group size is greater than the second group size, assigning segments of the third and fourth packets prior to assigning segments of the first and second packets.

* * * * *